United States Patent
Park et al.

(10) Patent No.: US 12,526,494 B2
(45) Date of Patent: Jan. 13, 2026

(54) APPARATUS FOR ADJUSTING ATTITUDE

(71) Applicant: Hanwha Vision Co., Ltd., Seongnam-si (KR)

(72) Inventors: Chang Wook Park, Seongnam-si (KR); Byeong Ho Lee, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 100 days.

(21) Appl. No.: 18/402,289

(22) Filed: Jan. 2, 2024

(65) Prior Publication Data

US 2024/0305870 A1 Sep. 12, 2024

(30) Foreign Application Priority Data

Mar. 7, 2023 (KR) .................. 10-2023-0030063
Oct. 11, 2023 (KR) .................. 10-2023-0134949

(51) Int. Cl.
*H04N 23/50* (2023.01)
*G03B 17/55* (2021.01)

(52) U.S. Cl.
CPC ............. *H04N 23/50* (2023.01); *G03B 17/55* (2013.01)

(58) Field of Classification Search
CPC ........ H04N 23/50; H04N 23/51; H04N 23/52; H04N 23/45; H04N 23/90; H04N 23/57; H04N 7/181; G03B 17/02; G03B 17/55; G03B 17/561; G03B 19/023
See application file for complete search history.

(56) References Cited

U.S. PATENT DOCUMENTS

| | | | | |
|---|---|---|---|---|
| 10,791,254 | B2 * | 9/2020 | Shin | G08B 13/19632 |
| 11,226,545 | B2 * | 1/2022 | Axelsson | H04N 23/50 |
| 11,525,973 | B2 * | 12/2022 | Li | H04N 23/45 |
| 2014/0063334 | A1 | 3/2014 | McBride et al. | |
| 2015/0358538 | A1 | 12/2015 | Donaldson | |
| 2023/0403448 | A1 * | 12/2023 | Kimura | H05K 7/20136 |

(Continued)

FOREIGN PATENT DOCUMENTS

| | | |
|---|---|---|
| CN | 111989909 A | 11/2020 |
| CN | 211880485 U | 11/2020 |
| JP | 9-139593 A | 5/1997 |

(Continued)

OTHER PUBLICATIONS

Office Action issued on Dec. 6, 2024 by the Swedish Patent Office in corresponding SE Patent Application No. 2351470-6.

*Primary Examiner* — Kelly L Jerabek
(74) *Attorney, Agent, or Firm* — Sughrue Mion, PLLC

(57) ABSTRACT

An apparatus for adjusting an attitude of a device, the apparatus including a base portion providing a rotational axis for the device, a peripheral assembly of the device disposed in a ring along a periphery of the rotational axis, a sealing cover coupled to the base and sealing the peripheral assembly, and an air circulator configured to circulate air in a base space formed by the base and the sealing cover. The base includes a base cover, and a base ring provided inside the base cover and supporting the peripheral assembly of the device, where the base cover is coupled to the sealing cover and forms the base space. The base further includes a support panel provided between the base cover and the base ring and supports a substrate, where the base cover is coupled to the sealing cover and forms the base space.

20 Claims, 10 Drawing Sheets

(56) References Cited

U.S. PATENT DOCUMENTS

2024/0329499 A1* 10/2024 Abe ................. G03B 17/55

FOREIGN PATENT DOCUMENTS

| | | |
|---|---|---|
| JP | 2021-177608 A | 11/2021 |
| KR | 10-2006-0062011 A | 6/2006 |
| KR | 10-1061835 B1 | 9/2011 |
| KR | 10-1128367 B1 | 3/2012 |
| KR | 10-1139768 B1 | 4/2012 |
| KR | 10-1229057 B1 | 2/2013 |
| KR | 10-1508245 B1 | 4/2015 |
| KR | 10-1651877 B1 | 8/2016 |
| WO | 2019/208215 A1 | 10/2019 |

* cited by examiner

APPARATUS FOR ADJUSTING ATTITUDE

CROSS-REFERENCE TO RELATED APPLICATIONS

This application is based on and claims priority from Korean Patent Application No. 10-2023-0030063 filed on Mar. 7, 2023 and No. 10-2023-0134949 filed on Oct. 11, 2023 in the Korean Intellectual Property Office, the disclosures of which are incorporated herein in their entireties by reference.

BACKGROUND

1. Field

The present disclosure relates to an apparatus for adjusting an attitude, and more particularly, to an apparatus for adjusting an attitude, which is capable of adjusting a position of a peripheral camera along the periphery of a central camera.

2. Description of Related Art

A camera may be used for monitoring a target place. A user may monitor a corresponding place by referring to an image photographed by the camera.

When the camera is directed toward only one point, a monitoring area may be restricted. Accordingly, pan-tilt equipment may be mounted on the camera to change a photographing direction of the camera. The pan-tilt equipment may switch the photographing direction at the request of the user or automatically, and the camera may perform photographing of the switched photographing direction.

Meanwhile, even though the pan-tilt equipment is mounted on the camera, it may not be easy to monitor a plurality of different points. In addition, as a plurality of cameras are used, too much installation and management costs may be involved for monitoring of the plurality of points.

Therefore, an invention that enables monitoring of a plurality of different points at less installation and management costs will be required.

SUMMARY

Provided is an apparatus for adjusting an attitude, which is capable of adjusting a position of a peripheral camera along the periphery of a central camera.

Additional aspects will be set forth in part in the description which follows and, in part, will be apparent from the description, or may be learned by practice of the presented embodiments.

According to an aspect of an embodiment, an apparatus for adjusting an attitude of a device may include: a base providing a rotational axis for the device, a peripheral assembly of the device disposed in a shape of a ring along a periphery of the rotational axis, a sealing cover coupled to the base and sealing the peripheral assembly, and an air circulator configured to circulate air in a base space formed by the base and the sealing cover.

The base may include a base cover, and a base ring provided inside the base cover and supporting the peripheral assembly, where the base cover is coupled to the sealing cover and forms the base space.

The base may include a support panel provided between the base cover and the base ring and supports a substrate, where the support panel includes an air hole that allows for circulation of air.

The support panel may include a material having a predetermined thermal conductivity.

The base space may include a first base space formed on a first side of the support panel which does not face the sealing cover, and a second base space formed on a second side of the support panel which faces the sealing cover, where the air circulator is configured to circulate air between the first base space and the second base space.

The air circulator may be disposed in the first base space and configured to circulate air to the second base space through the air hole.

The second base space may include a first air passage formed to move air from the air hole to the sealing cover, and a second air passage formed to move air from the sealing cover to the first base space.

At least a portion of the first air passage may be formed to move air along a surface of the support panel.

The base may further include a base cylinder that inserts into a center of the base ring, where at least a portion of the first air passage is in communication with the base cylinder.

The apparatus may include a central assembly of the device rotatably coupled to the base cylinder of the base, where the central assembly is configured to rotate about the rotational axis.

At least a portion of the second air passage may be formed to move air along an inner side of the sealing cover.

At least a portion of the second air passage may be formed to move air along an inner side of the base cover.

The second air passage may include a slit formed between the base ring and the base cover.

The second air passage may include a space formed between an inner side of the base cover and an outer side of the base ring.

The air circulator may include an air sprayer configured to spray the air, and a channel configured to guide the air sprayed by the air spray unit to the air hole.

The channel may be configured to guide at least a portion of the air sprayed by the air sprayer to the air hole.

The sealing cover may be provided in a shape of a ring corresponding to an arrangement pattern of the peripheral assembly.

The air circulated by the air circulator may move in a shape of a ring corresponding to the shape of the sealing cover.

The peripheral assembly of the device may be coupled to the base and configured to revolve about the rotational axis.

The peripheral assembly of the device may be provided in plurality, where the plurality of peripheral assemblies are configured to independently revolve around the rotational axis.

The device may include at least one camera.

According to an aspect of an embodiment, an apparatus for adjusting an attitude of device may include: a base providing a rotational axis for the device and including a base ring disposed along a periphery of the rotational axis, a peripheral assembly of the device coupled to the base portion along the base ring, and a sealing cover coupled to the base, where the peripheral assembly is configured to revolve about the rotational axis along the base ring.

The apparatus may include an air circulator configured to circulate air in a base space formed by the base and the sealing cover, where the base further comprises a base cover and a support panel provided between the base cover and the base ring, and where the support panel includes an air hole that allows for circulation of air.

The base space may include a first base space formed on a first side of the support panel which does not face the sealing cover, and a second base space formed on a second side of the support panel which faces the sealing cover, where the air circulator is configured to circulate air between the first base space and the second base space.

According to an aspect of an embodiment, an apparatus for adjusting an attitude of a plurality of devices may include: a base providing a rotational axis for the plurality of devices and including a base ring disposed along a periphery of the rotational axis, a peripheral assembly coupled to the base portion along the base ring and including at least one device, a sealing cover coupled to the base, a central assembly rotatably coupled to the base portion and including another at least one device, and an air circulator configured to circulate air in a base space formed by the base and the sealing cover, where the peripheral assembly is configured to revolve about the rotational axis along the base ring, and where the central assembly is configured to rotate about the rotational axis.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
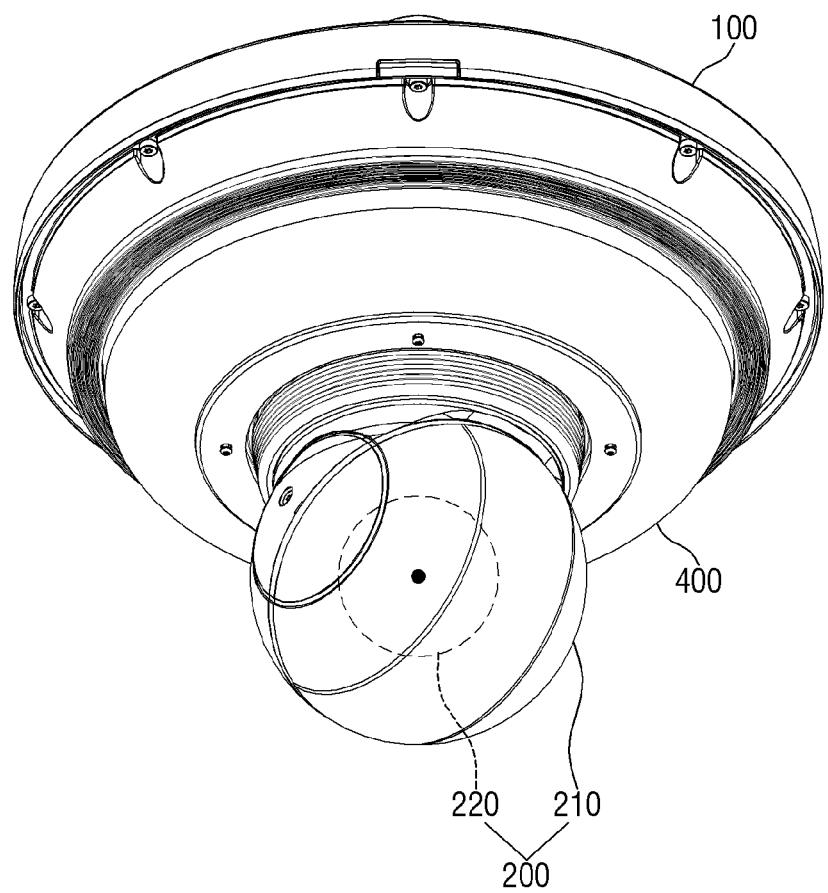
FIG. 1 is a perspective view illustrating an apparatus for adjusting an attitude of a device according to an embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise.

The terms including technical or scientific terms used in the disclosure may have the same meanings as generally understood by those skilled in the art.

Unless otherwise defined, all terms (including technical and scientific terms) used in the present specification may be used as meanings that can be commonly understood by those of ordinary skill in the art to which the present invention belongs. In addition, terms defined in a commonly used dictionary are not interpreted ideally or excessively unless explicitly defined specifically.

Figure 2:
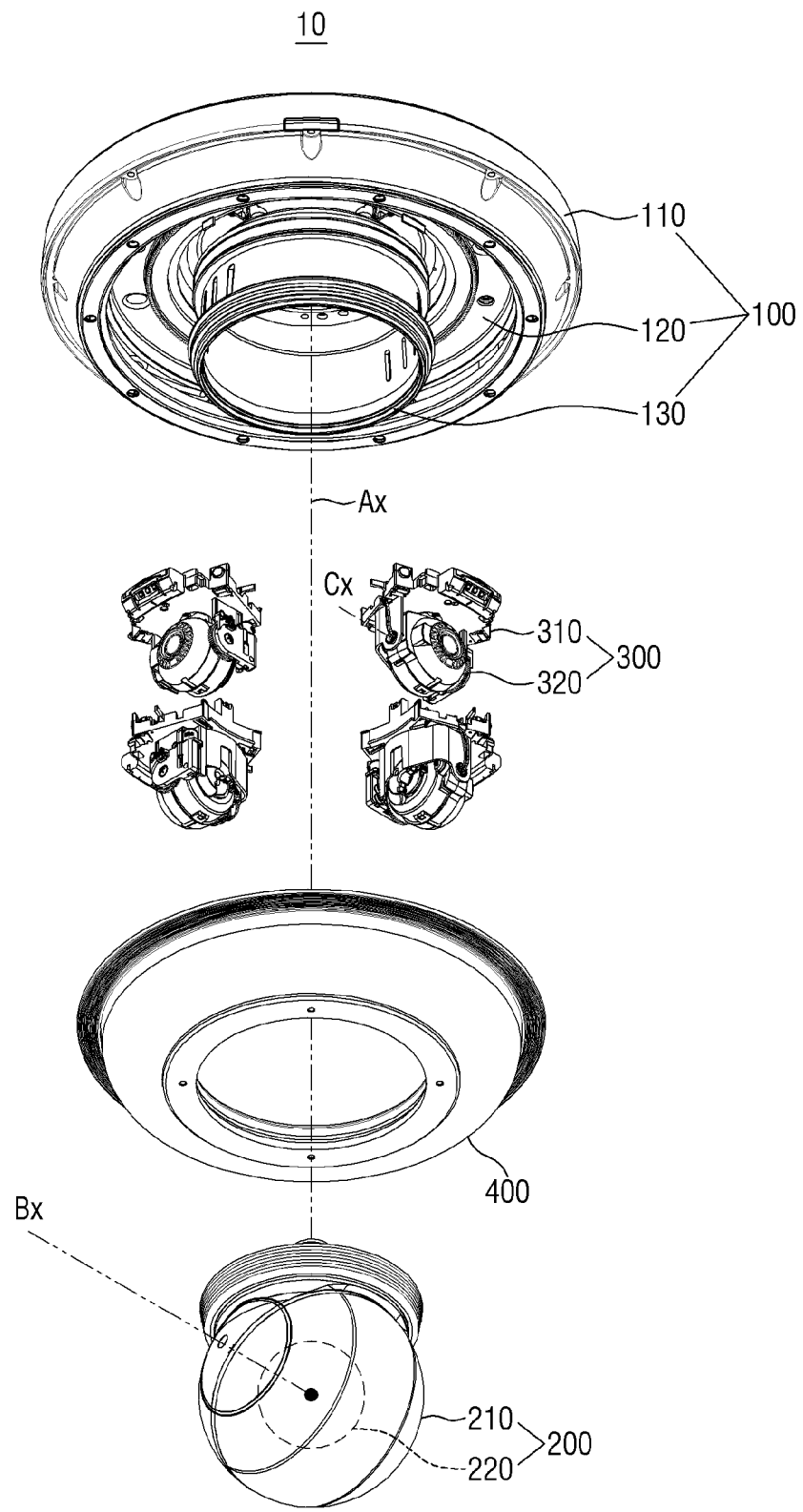
FIG. 2 is an exploded perspective view illustrating an apparatus for adjusting an attitude of a device according to an embodiment of the present disclosure.
Figure 3:
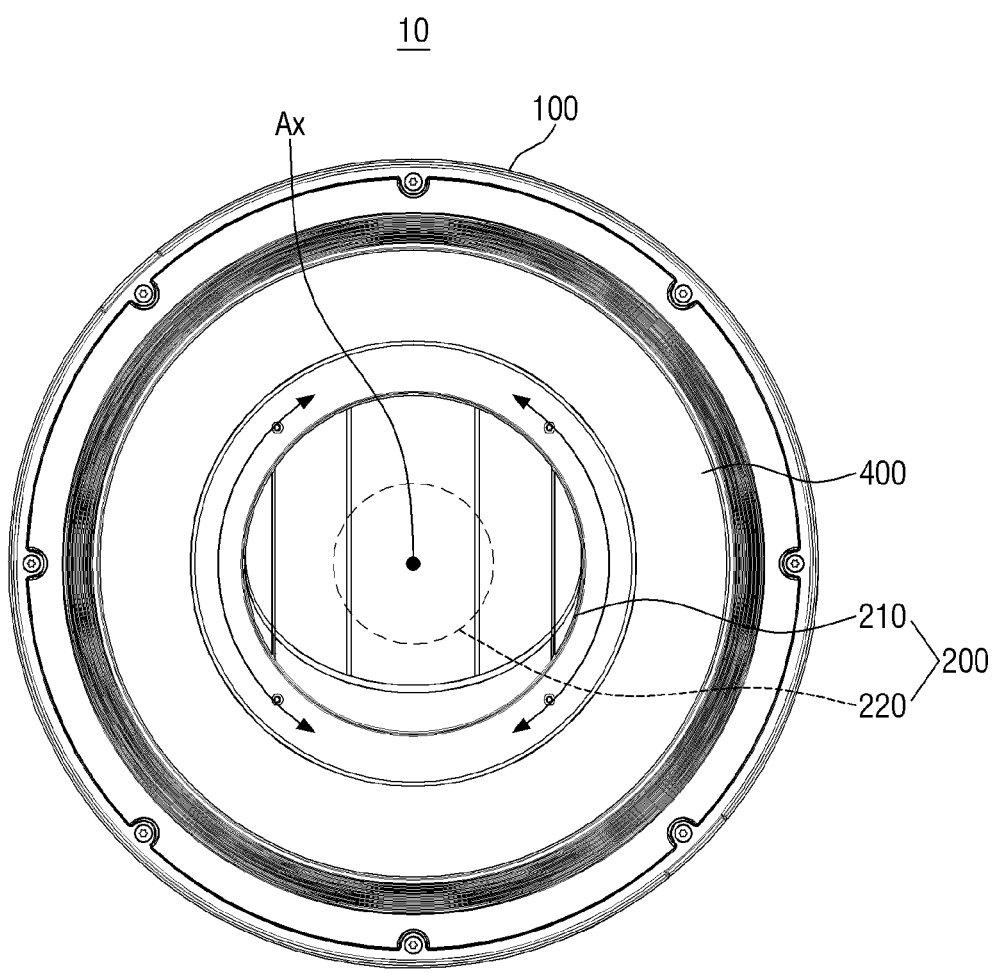
FIG. 3 is a view illustrating that a central assembly is rotated with respect to a base according to an embodiment of the present disclosure.
Figure 4:
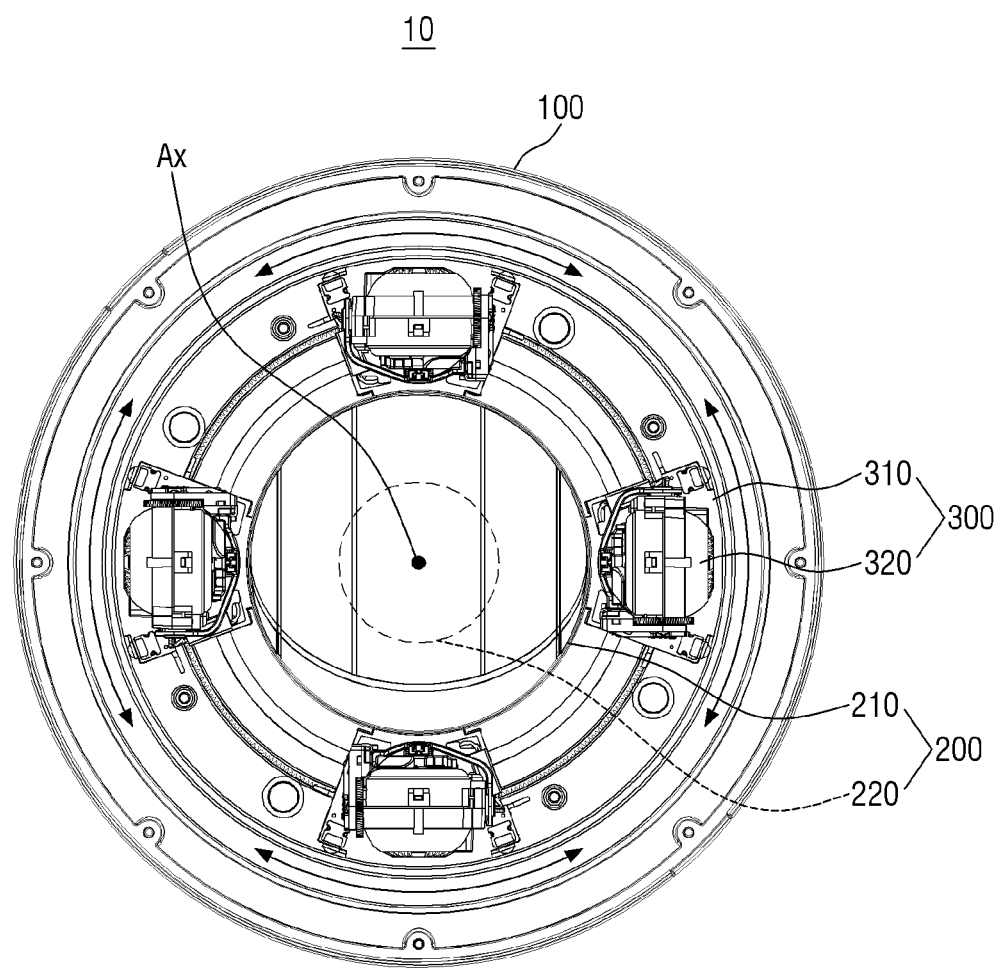
FIG. 4 is a view illustrating that a peripheral assembly is rotated with respect to a base according to an embodiment of the present disclosure.

FIG. 1 is a perspective view illustrating an apparatus for adjusting an attitude according to the embodiment of the present disclosure, FIG. 2 is an exploded perspective view illustrating an apparatus for adjusting an attitude according to the embodiment of the present disclosure, FIG. 3 is a view illustrating that a central camera portion is rotated with respect to a base portion, and FIG. 4 is a view illustrating that a peripheral camera portion is rotated with respect to a base portion.

Referring to FIGS. 1 and 2, an apparatus 10 for adjusting an attitude according to the embodiment of the present disclosure may include a base portion 100, a central camera portion 200, a peripheral camera portion 300 and a sealing cover 400.

The base portion 100 may include a base body 110, a base ring 120 and a base cylinder 130. The base portion 100 may support the central camera portion 200 and the peripheral camera portion 300. The base portion 100 may be coupled to an installation target. For example, the base portion 100 may be coupled to a ceiling or a wall of a building. The central camera portion 200 and the peripheral camera portion 300 may be coupled to the base portion 100 so that a position of the installation target may be determined.

The base portion 100 may provide a rotational axis Ax. According to the present disclosure, the base portion 100 may be provided in the form of a disk, and a central axis of the disk may correspond to the rotational axis Ax.

The central camera portion 200 may include a camera housing 210 and a central camera 220. The central camera 220 may photograph a monitoring area of a preset range and generate an image thereof. The image generated by the central camera 220 may be a still image or a moving image. For example, the central camera 220 may be a visible light camera, a low-light camera or an infrared camera.

The camera housing 210 may accommodate the central camera 220. The central camera 220 may receive light transmitted through the camera housing 210 and process the light to generate an image. To this end, a portion of the camera housing 210 corresponding to the photographing direction of the central camera 220 may be made of a material for transmitting light.

The central camera 220 may be rotated with respect to the camera housing 210. The central camera 220 may be tilt-rotated with respect to the camera housing 210. A central rotational axis Bx serving as a reference for rotation of the central camera 220 with respect to the camera housing 210 may be formed to be different from the rotational axis Ax of the base portion 100. For example, the central rotational axis Bx may be formed in a direction perpendicular to the rotational axis Ax of the base portion 100. For rotation of the central camera 220 with respect to the camera housing 210, a driving device such as a motor and a gear may be provided inside the camera housing 210.

The portion 200 may be coupled to the base portion 100 so as to be rotatable around the rotational axis Ax of the base portion 100. Referring to FIG. 3, the central camera portion 200 may be rotated around the rotational axis Ax. As the central camera portion 200 is rotated around the rotational axis Ax and the central camera 220 is tilt-rotated with respect to the camera housing 210, various attitudes of the central camera 220 may be adjusted with respect to the installation target.

Referring back to FIGS. 1 and 2, the peripheral camera portion 300 may include a moving body 310 and a peripheral camera 320. The peripheral camera 320 may photograph a monitoring area of a preset range and generate an image thereof. The image generated by the peripheral camera 320 may be a still image or a moving image. For example, the peripheral camera 320 may be a visible light camera, a low-light camera or an infrared camera.

The moving body 310 may support the peripheral camera 320. In addition, the moving body 310 may be coupled to the base portion 100. The position of the peripheral camera 320 with respect to the base portion 100 may be determined through the moving body 310.

The peripheral camera 320 may be rotated with respect to the moving body 310. The peripheral camera 320 may be tilt-rotated with respect to the moving body 310. A peripheral rotational axis Cx serving as a reference for rotation of the peripheral camera 320 with respect to the moving body 310 may be formed to be different from the rotational axis Ax of the base portion 100. For example, the peripheral rotational axis Cx may be formed in a direction perpendicular to the rotational axis Ax of the base portion 100.

The peripheral camera portion 300 may be disposed in the shape of a ring along the periphery of the rotational axis Ax of the base portion 100. The peripheral camera portion 300 may generate an image by photographing in an outward direction of the central camera portion 200.

The peripheral camera portion 300 may be coupled to the base portion 100 to be able to be revolved around the rotational axis Ax of the base portion 100. Referring to FIG. 4, the peripheral camera portion 300 may be revolved around the rotational axis Ax. The peripheral camera portion 300 may rotate along the periphery of the central camera portion 200.

In the present disclosure, a plurality of peripheral camera portions 300 may be provided. The plurality of peripheral camera portions 300 may perform photographing while rotating around the central camera portion 200. A photographing direction of the peripheral camera portion 300 may be formed in a radial direction from the rotational axis Ax of the base portion 100. As the plurality of peripheral camera portions 300 photograph different directions, a wide range of monitoring may be performed. As the peripheral camera portion 300 is revolved around the rotational axis Ax and the peripheral camera 320 is tilt-rotated with respect to the moving body 310, various attitudes of the peripheral camera 320 may be adjusted with respect to the installation target.

The sealing cover 400 may be provided in the shape of a ring and coupled to base portion 100. A through hole through which the base cylinder 130 of the base portion 100 passes may be formed in the sealing cover 400. The base cylinder 130 and the central camera portion 200 may be coupled to each other through the through hole of the sealing cover 400.

The sealing cover 400 may seal the peripheral camera portion 300 against the outside. The peripheral camera 320 provided in the peripheral camera portion 300 may receive light transmitted through the sealing cover 400 and process the light to generate an image. To this end, a portion of the sealing cover 400 corresponding to the photographing direction of the peripheral camera 320 may be made of a material for transmitting light.

Figure 5:
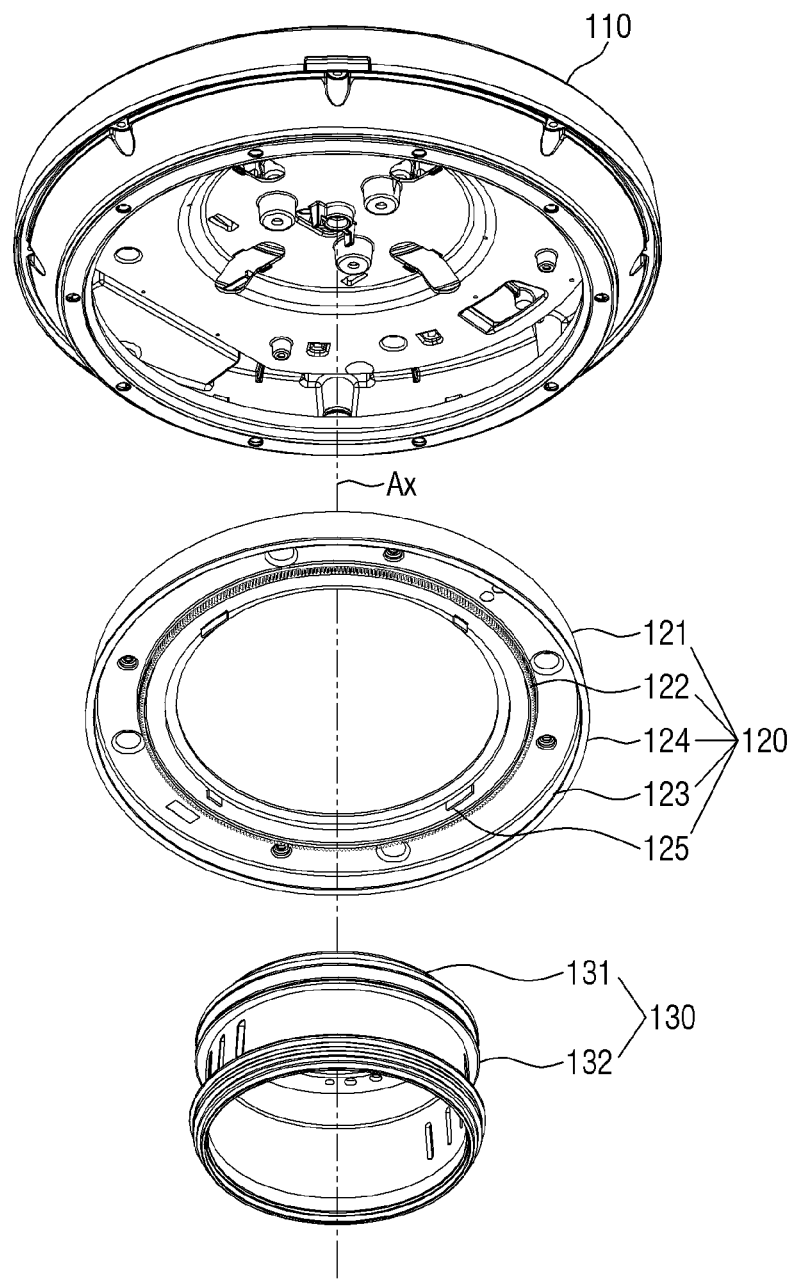
FIG. 5 is an exploded perspective view illustrating the base according to an embodiment of the present disclosure.

FIG. 5 is an exploded perspective view illustrating the base portion.

Referring to FIG. 5, the base portion 100 may include a base body 110, a base ring 120 and a base cylinder 130.

The base body 110 may provide a reference position of the apparatus 10 for adjusting an attitude. The base body 110 may be coupled to the aforementioned installation target. The central camera portion 200 and the peripheral camera portion 300 may be indirectly coupled to the base body 110 so that the position of the installation target may be determined.

The base body 110 may form a predetermined internal space. Various components for the operation of the central camera portion 200 and the peripheral camera portion 300 may be accommodated in the internal space. The base body 110 may include a circular opening for connecting the internal space with the outside. Various cables for the operation and control of the central camera portion 200 and the peripheral camera portion 300 may be connected to the central camera portion 200 and the peripheral camera portion 300 through the opening.

The base ring 120 may be provided in the shape of a ring and coupled to the base body 110. The base ring 120 may be provided inside a base cover 111 (see FIG. 6) that will be described later. The base ring 120 may support the peripheral camera portion 300 and provide a moving path of the peripheral camera portion 300.

The peripheral camera portion 300 may move along the moving path of an arc shape corresponding to the base ring 120. As described above, the apparatus 10 for adjusting an attitude may include a plurality of peripheral camera portions 300. The plurality of peripheral camera portions 300 may be individually revolved around the rotational axis Ax. For example, all of the plurality of peripheral camera portions 300 provided in the apparatus 10 for adjusting an attitude may simultaneously move in the same direction as much as the same angle. Some of the plurality of peripheral cameras 320 provided in the apparatus 10 for adjusting an attitude may simultaneously move in the same direction as much as the same angle, and the other peripheral cameras 320 may move in different directions as much as different angles. All of the plurality of peripheral cameras 320 provided in the apparatus 10 for adjusting an attitude may move in different directions as much as different angles.

The base ring 120 may include a ring body 121, a ring gear 122, a support ring 123, a guide ring 124 and an interrupter 125. The ring body 121 may be provided in the shape of a ring by using the rotational axis Ax of the base portion 100 as a central axis. A through hole through which the base cylinder 130 passes may be formed in the ring body 121.

The ring gear 122 may be formed on a lower side of the ring body 121. The ring gear 122 may be gear-coupled to a power gear of the peripheral camera portion 300. The peripheral camera portion 300 may move along the ring gear 122.

The support ring 123 may be formed on an outer side of the ring body 121. The support ring 123 may be formed in the shape of a ring along the periphery of the ring gear 122. The support ring 123 may support the moving body 310 of the peripheral camera portion 300.

The guide ring 124 may be formed to protrude from an outer surface of the ring body 121 in the shape of a ring. The guide ring 124 may be formed to protrude from the support ring 123. The guide ring 124 may support the peripheral camera portion 300. The peripheral camera portion 300 may move along the guide ring 124 in a state that it is supported by the guide ring 124.

The interrupter 125 may be provided on the lower side of the ring body 121. The interrupter 125 may be sensed by a photo interrupter sensor provided in the peripheral camera portion 300 and used to check an initial position of the peripheral camera portion 300. A plurality of interrupters 125 may be provided. For example, the same number of interrupters 125 as the number of the peripheral camera portions 300 may be provided in the ring body 121. However, the same number of the interrupters 125 as the number of the peripheral camera portions 300 is only exemplary, and two or more interrupters 125 may be provided in the ring body 121 regardless of the number of the peripheral camera portions 300. When two or more interrupters 125 are provided in the ring body 121, the adjacent interrupters 125 may be different from each other in size. The position of the peripheral camera portion 300, which includes the corresponding photo interrupter sensor, may be determined by referring to the shape of the interrupter 125 sensed by the photo interrupter sensor.

The base cylinder 130 may be coupled to the base body 110. The base cylinder 130 may be extended from an inner wall of the base body 110 toward the opening. For example, the base cylinder 130 may pass through the center of the base ring 120, and a portion of the base cylinder 130 may be exposed to the outside of the base body 110. The base body 110 may be provided in the shape of a disk, and the base cylinder 130 may be provided in the shape of a cylinder. A central axis of the base body 110 may correspond with a central axis of the base cylinder 130.

The central camera portion 200 may be coupled to an end of the base cylinder 130, which is not coupled to the base body 110. The central camera portion 200 may be rotatably coupled to the base cylinder 130. The central axis of the aforementioned base cylinder 130 may correspond to the rotational axis Ax of the base portion 100. The central camera portion 200 may be rotated around the corresponding rotational axis Ax.

The base cylinder 130 may include a cylinder body 131 and a cylinder ring 132.

The cylinder body 131 is provided in the shape of a cylinder and coupled to the base portion 100. A central axis of the cylinder body 131 may correspond with the central axis of the base portion 100.

The cylinder ring 132 may be formed to protrude from an outer surface of the cylinder body 131 in the shape of a ring. The cylinder ring 132 may support the peripheral camera portion 300. The peripheral camera portion 300 may move along the cylinder ring 132 in a state that it is supported by the cylinder ring 132. As described above, the peripheral camera portion 300 may be supported by the guide ring 124 of the base ring 120. One side of the peripheral camera portion 300 may be supported by the guide ring 124, and the other side of the peripheral camera portion 300 may be supported by the cylinder ring 132.

Figure 6:
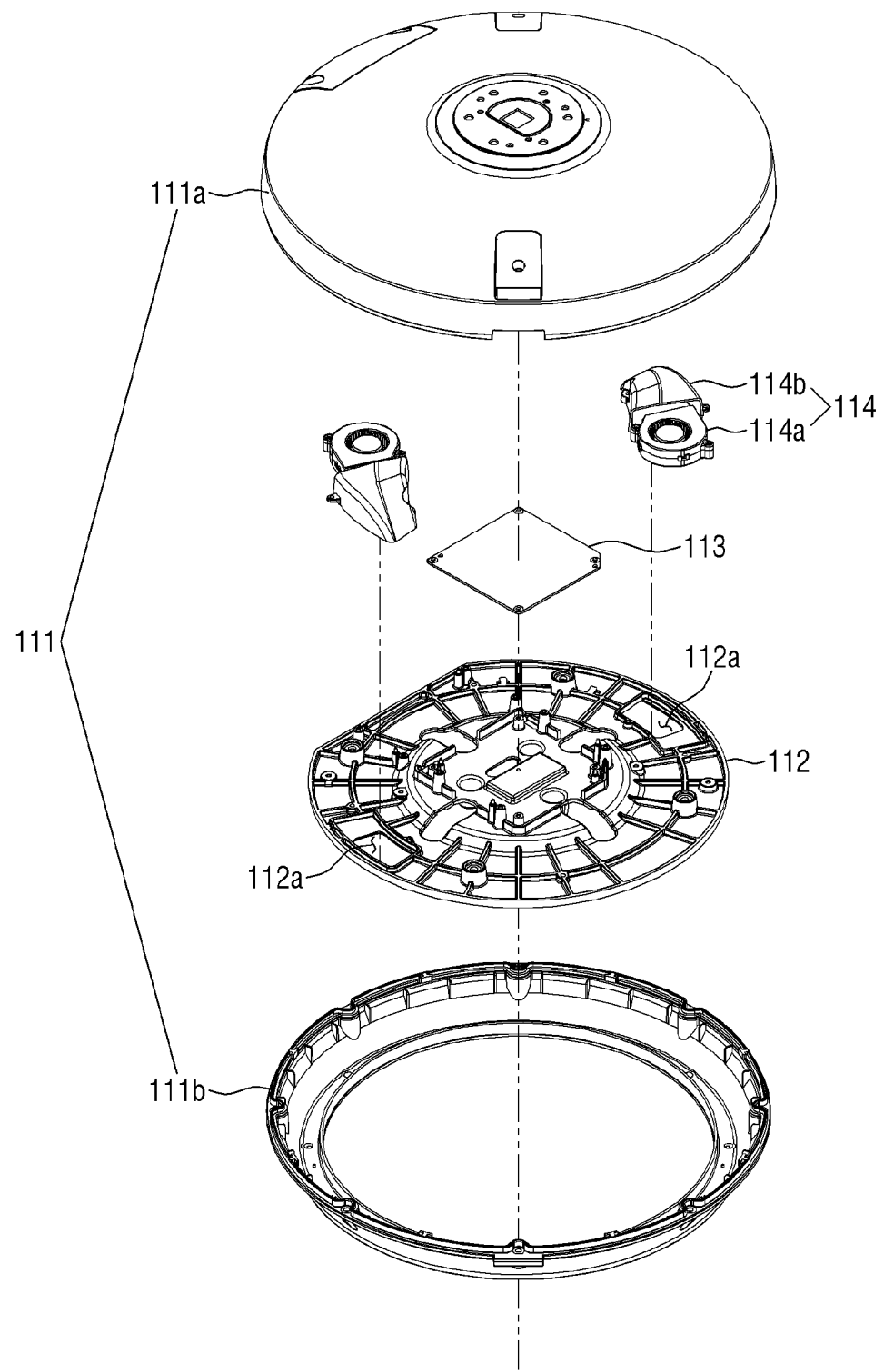
FIG. 6 is an exploded perspective view illustrating a base body according to an embodiment of the present disclosure.

FIG. 6 is an exploded perspective view illustrating a base body.

Referring to FIG. 6, the base body 110 may include a base cover 111, a support panel 112, a substrate 113 and an air circulator 114.

The base cover 111 may include a first base cover 111a and a second base cover 111b. The first base cover 111a may be provided in the shape of a disk, and the second base cover 111b may be provided in the shape of a ring. As the first base cover 111a and the second base cover 111b are coupled to each other, the base cover 111 may have a predetermined internal space and provided with an opening formed at one side.

Figure 9:
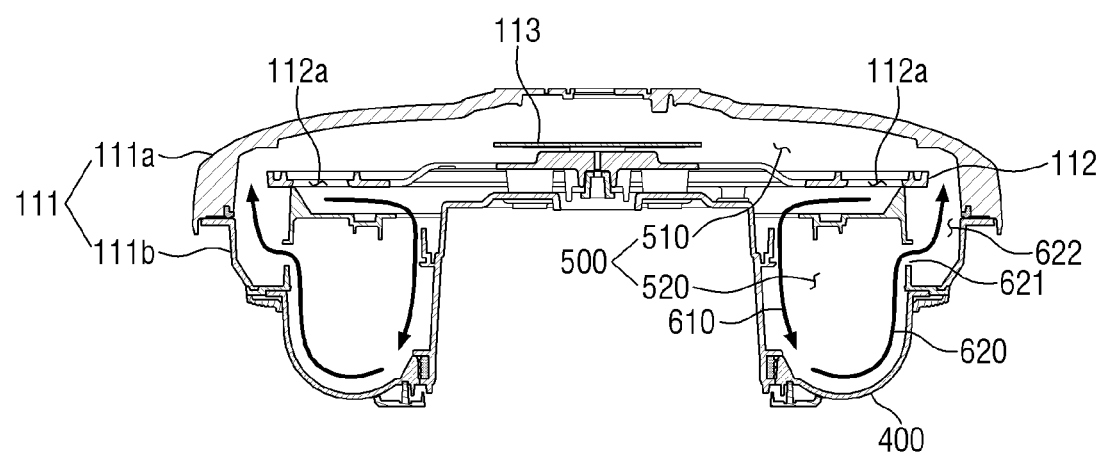
FIG. 9 is a view illustrating that the air is circulated in the base space according to an embodiment of the present disclosure.

The base cover 111 may be coupled to the sealing cover 400 to form a base space 500 (see FIG. 9). For example, the sealing cover 400 may be coupled to the second base cover 111b.

The support panel 112 may be provided in the internal space of the base cover 111. The support panel 112 may support the substrate 113.

A processor for overall control of the apparatus 10 for adjusting an attitude may be provided in the substrate 113. For example, the processor may control operations of the central camera 220, the peripheral camera 320, the central camera portion 200, the peripheral camera portion 300 and the air circulator 114.

A temperature of the substrate 113 may be increased by the operation of the processor. To avoid the temperature increase of the substrate 113, the support panel 112 may discharge heat of the substrate 113. To this end, the support panel 112 may be made of a material having thermal conductivity of a preset size or more. For example, the support panel 112 may be made of a metal, which has relatively high thermal conductivity, such as aluminum.

The support panel 112 may include an air hole 112a for circulation of the air. The base portion 100 and the sealing cover 400 may be coupled to each other to form the base space 500, and the air may be circulated in the base space 500 through the air hole 112a.

The air circulator 114 may serve to circulate the air in the base space 500 formed by the base portion 100 and the sealing cover 400. The air circulator 114 may include an air spray unit 114a and an air guide unit 114b. The air spray unit 114a may spray the air. To this end, the air spray unit 114a may include an impeller and a casing. The air suctioned by rotation of an impeller may be sprayed through an outlet provided in the casing. For rotation of the impeller, a driving means such as a motor may be provided.

The air guide unit 114b may serve to guide the air sprayed by the air spray unit 114a to the air hole 112a. An inlet of the air guide unit 114b may be formed to be larger than an outlet of the air spray unit 114a. All of the air sprayed from the air spray unit 114a may be guided by the air guide unit 114b to pass through the air hole 112a.

Figure 7:
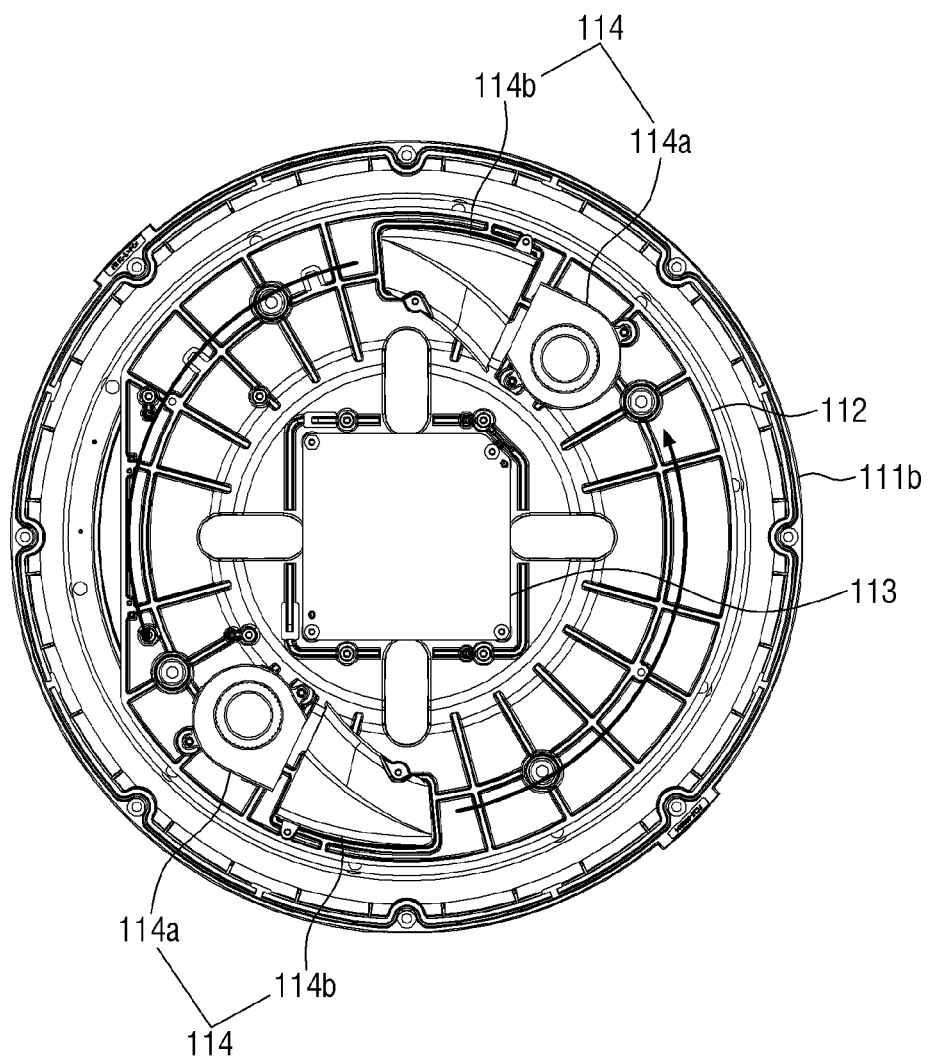
FIG. 7 is a view illustrating the inside of the base body according to an embodiment of the present disclosure.
Figure 8:
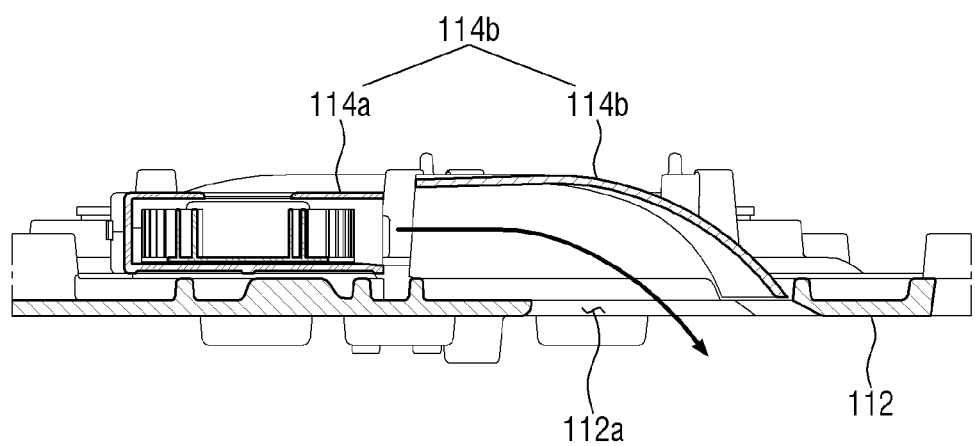
FIG. 8 is a view illustrating that the air passes through the air hole according to an embodiment of the present disclosure.

FIG. 7 is a view illustrating the inside of the base body, and FIG. 8 is a view illustrating that the air passes through the air hole.

Referring to FIGS. 7 and 8, the air circulator 114 may be disposed on one side of the support panel 112.

The air sprayed by the air spray unit 114a may be guided by the air guide unit 114b to pass through the air hole 112a. For example, the air spray unit 114a may spray the air in a direction parallel with a wide surface of the support panel 112, and the air guide unit 114b may switch the direction of the air.

The air guide unit 114b may guide the air in a direction inclined with respect to the wide surface of the support panel 112. Referring to FIG. 8, the air sprayed in the direction parallel with the wide surface of the support panel 112 may be guided by the air guide unit 114b in the direction inclined with respect to the wide surface of the support panel 112. Hereinafter, the direction parallel with the wide surface of the support panel 112 will be referred to as a parallel direction, and a direction perpendicular to the wide surface of the support panel 112 will be referred to as a vertical direction.

The air passes through the air hole 112a by a vertical moving component, and the air may move in the shape of a ring along an edge of the base space 500 by a parallel moving component.

The sealing cover 400 for sealing the peripheral camera portion 300 against the outside may be provided in the shape of a ring corresponding to an arrangement pattern of the peripheral camera portion 300. The air sprayed from the air circulator 114 may move in the shape of a ring corresponding to the shape of the sealing cover 400. The air having the parallel moving component may be guided by the base cover 111 and the sealing cover 400, and then may move in the shape of a ring in the base space 500. As the air moves in the shape of a ring in the base space 500, uniform air circulation is possible with respect to the entire base space 500. As the air moves in the shape of a ring along the sealing cover 400, occurrence of dew condensation on the sealing cover 400 may be effectively avoided.

FIG. 9 is a view illustrating that the air is circulated in the base space.

Referring to FIG. 9, the air may be circulated in the base space 500 formed by the base cover 111 and the sealing cover 400.

As the base cover 111 and the sealing cover 400 are coupled to each other, the base space 500 sealed against the outside may be formed. The support panel 112 for supporting the substrate 113 may be provided between the base cover 111 and the base ring 120.

The base space 500 may include a first base space 510 and a second base space 520. The first base space 510 represents a space formed on one side of the support panel 112 that does not face the sealing cover 400. The second base space 520 represents a space formed on the other side of the support panel 112 that faces the sealing cover 400. Referring to FIG. 9, a space formed above the support panel 112 may correspond to the first base space 510, and a space formed below the support panel 112 may correspond to the second base space 520.

The air circulator 114 may circulate the air between the first base space 510 and the second base space 520. The air circulator 114 may be disposed in the first base space 510, and may supply the air to the second base space 520 through the air hole 112a. The air supplied to the second base space 520 may move back to the first base space 510.

The second base space 520 may include a first air passage 610 and a second air passage 620. The first air passage 610 represents a passage for moving the air from the air hole 112a to the sealing cover 400, and the second air passage 620 represents a passage for moving the air from the sealing cover 400 to the first base space 510.

At least a portion of the first air passage 610 may be formed to move the air along the surface of the support panel 112. The base ring 120 may be provided under the air hole 112a. The base ring 120 may induce the air in an inward direction toward the rotational axis Ax. The air induced by the base ring 120 may move along the surface of the support panel 112. In this case, the air may absorb heat emitted from the support panel 112 to improve heat dissipation efficiency of the support panel 112.

At least a portion of the air moving along the first air passage 610 may be in contact with the base cylinder 130. The air that is in contact with the base cylinder 130 may prevent dew condensation from occurring on a surface of the base cylinder 130.

The air moving along the first air passage 610 may reach the sealing cover 400. At least a portion of the second air passage 620 may be formed to move the air along an inner side of the sealing cover 400. The air may be heated by the heat emitted from the support panel 112. The heated air may move along the inner side of the sealing cover 400 to prevent dew condensation from occurring on the inner side of the sealing cover 400.

The second air passage 620 may include a slit 621 formed between the base ring 120 and the base cover 111. In addition, the second air passage 620 may include an air moving space 622 formed between an inner side of the base cover 111 and an outer side of the base ring 120. The air supplied to the sealing cover 400 may move to the air moving space 622 by passing through the slit 621. The air passing through the air moving space 622 may move to the first base space 510.

At least a portion of the second air passage 620 may be formed to move the air along the inner side of the base cover 111. The air may move to the first base space 510 while being in contact with the inner side of the base cover 111.

The air supplied to the second base space 520 may move to the first base space 510 after being cooled while being in contact with the base cylinder 130, the sealing cover 400 and the base cover 111. Therefore, heat dissipation efficiency of the support panel 112 may be improved, and dew condensation may be prevented from being formed in the base cylinder 130 and the sealing cover 400.

Figure 10:
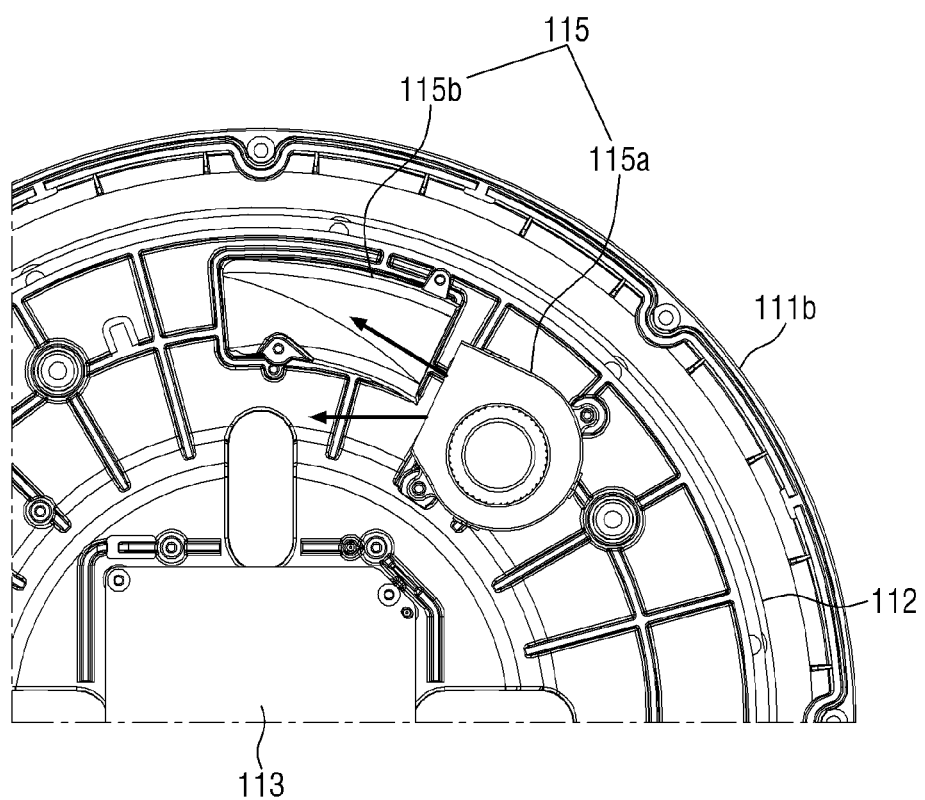
FIG. 10 is a view illustrating an air circulator according to another embodiment of the present disclosure.

FIG. 10 is a view illustrating an air circulator according to another embodiment of the present disclosure.

Referring to FIG. 10, an air circulator 115 may be disposed on the support panel 112 to spray the air.

The air circulator 115 may include an air spray unit 115a and an air guide unit 115b. Shapes and functions of the air spray unit 115a and the air guide unit 115b may be substantially similar as the shapes and functions of the air spray unit 114a and the air guide unit 114b, which are described above. Therefore, the following description will be based on differences from the air spray unit 114a and the air guide unit 114b.

The air guide unit 115b may guide a portion of the air sprayed by the air spray unit 115a to the air hole 112a. A portion of the air sprayed by the air spray unit 115a may pass through the air hole 112a, and the other portion thereof may be circulated in the first base space 510. The air passing through the air hole 112a may prevent dew condensation from occurring in the base cylinder 130 and the sealing cover 400, and the air circulating in the first base space 510 may prevent temperatures of various components provided in the first base space 510 from being increased.

Although the above-described apparatus is for adjusting an attitude of a camera, this is merely for exemplary purposes and should not be construed as limiting. A different device may be installed such as a sensor or any other instrument requiring positional or orientational adjustment.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An apparatus for adjusting an attitude of a device, the apparatus comprising:
   a base providing a rotational axis for the device;

a peripheral assembly of the device disposed in a shape of a ring along a periphery of the rotational axis;
a sealing cover coupled to the base and sealing the peripheral assembly; and
an air circulator configured to circulate air in a base space formed by the base and the sealing cover,
wherein the base comprises:
a base cover;
a base ring provided inside the base cover and supporting the peripheral assembly of the device; and
a support panel provided between the base cover and the base ring and supports a substrate,
wherein the base cover is coupled to the sealing cover and forms the base space,
wherein the support panel comprises an air hole that allows for circulation of air,
wherein the base space comprises:
a first base space formed on a first side of the support panel which does not face the sealing cover; and
a second base space formed on a second side of the support panel which faces the sealing cover, and
wherein the air circulator is configured to circulate air between the first base space and the second base space.

2. The apparatus of claim 1, wherein the support panel comprises a material having a predetermined thermal conductivity.

3. The apparatus of claim 1, wherein the air circulator is disposed in the first base space and is configured to circulate air to the second base space through the air hole.

4. The apparatus of claim 1, wherein the second base space comprises:
a first air passage formed to move air from the air hole to the sealing cover; and
a second air passage formed to move air from the sealing cover to the first base space.

5. The apparatus of claim 4, wherein at least a portion of the first air passage is formed to move air along a surface of the support panel.

6. The apparatus of claim 4, wherein the base further comprises a base cylinder which inserts into a center of the base ring, and
wherein at least a portion of the first air passage is in communication with the base cylinder.

7. The apparatus of claim 6, further comprising a central assembly of the device rotatably coupled to the base cylinder of the base,
wherein the central assembly is configured to rotate about the rotational axis.

8. The apparatus of claim 4, wherein at least a portion of the second air passage is formed to move air along an inner side of the sealing cover.

9. The apparatus of claim 4, wherein at least a portion of the second air passage is formed to move air along an inner side of the base cover.

10. The apparatus of claim 4, wherein the second air passage comprises a slit formed between the base ring and the base cover.

11. The apparatus of claim 4, wherein the second air passage includes a space formed between an inner side of the base cover and an outer side of the base ring.

12. The apparatus of claim 1, wherein the air circulator comprises:
an air sprayer configured to spray air; and
a channel configured to guide the air sprayed by the air sprayer to the air hole.

13. The apparatus of claim 12, wherein the channel is configured to guide at least a portion of the air sprayed by the air sprayer to the air hole.

14. The apparatus of claim 1, wherein the sealing cover is provided in a shape of the ring corresponding to an arrangement pattern of the peripheral assembly of the device.

15. The apparatus of claim 14, wherein the air circulated by the air circulator moves in a shape of the ring corresponding to the shape of the sealing cover.

16. The apparatus of claim 1, wherein the peripheral assembly of the device is coupled to the base and configured to revolve about the rotational axis.

17. The apparatus of claim 16, wherein the peripheral assembly of the device is provided in plurality, and
wherein the plurality of peripheral assemblies are configured to independently rotate about the rotational axis.

18. The apparatus of claim 1, wherein the device is at least one camera.

19. An apparatus for adjusting an attitude of a device comprising:
a base providing a rotational axis for the device and comprising a base ring disposed along a periphery of the rotational axis;
a peripheral assembly of the device coupled to the base along the base ring;
a sealing cover coupled to the base; and
an air circulator configured to circulate air in a base space formed by the base and the sealing cover,
wherein the peripheral assembly of the device is configured to revolve about the rotational axis along the base ring,
wherein the base further comprises a base cover and a support panel provided between the base cover and the base ring,
wherein the support panel comprises an air hole that allows for circulation of air,
wherein the base space comprises:
a first base space formed on a first side of the support panel which does not face the sealing cover; and
a second base space formed on a second side of the support panel which faces the sealing cover, and
wherein the air circulator is configured to circulate air between the first base space and the second base space.

20. An apparatus for adjusting an attitude of a plurality of devices comprising:
a base providing a rotational axis for the plurality of devices and comprising a base ring disposed along a periphery of the rotational axis;
a peripheral assembly coupled to the base along the base ring and comprising at least one device;
a sealing cover coupled to the base;
a central assembly rotatably coupled to the base and comprising another at least one device; and
an air circulator configured to circulate air in a base space formed by the base and the sealing cover,
wherein the peripheral assembly is configured to revolve about the rotational axis along the base ring,
wherein the central assembly is configured to rotate about the rotational axis,
wherein the base further comprises a base cover and a support panel provided between the base cover and the base ring,
wherein the support panel comprises an air hole that allows for circulation of air,
wherein the base space comprises:
a first base space formed on a first side of the support panel which does not face the sealing cover; and a second base space formed on a second side of the support panel which faces the sealing cover, and
wherein the air circulator is configured to circulate air between the first base space and the second base space.

* * * * *